United States Patent
Takahashi et al.

(10) Patent No.: US 9,051,949 B2
(45) Date of Patent: Jun. 9, 2015

(54) CLIP FOR ATTACHING EA MEMBER, AND EA MEMBER

(71) Applicant: BRIDGESTONE CORPORATION, Chuo-ku, Tokyo (JP)

(72) Inventors: Yoshiyuki Takahashi, Yokohama (JP); Shin Tada, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 97 days.

(21) Appl. No.: 13/799,820

(22) Filed: Mar. 13, 2013

(65) Prior Publication Data

US 2014/0259546 A1    Sep. 18, 2014

(51) Int. Cl.
| | |
|---|---|
| *F16B 43/00* | (2006.01) |
| *F16B 5/04* | (2006.01) |
| *B60R 13/02* | (2006.01) |
| *B60R 21/04* | (2006.01) |

(52) U.S. Cl.
CPC .................. *F16B 5/045* (2013.01); *Y10T 24/30* (2015.01); *Y10T 24/4086* (2015.01); *B60R 13/0206* (2013.01); *B60R 21/0428* (2013.01)

(58) Field of Classification Search
CPC .. B60R 21/0428; B60R 13/0206; F16B 5/045
USPC ............. 411/82, 82.1, 531, 24; 403/267, 268; 156/66; 52/787.12; 264/46.7
IPC .......................................................... F16B 5/01
See application file for complete search history.

(56) References Cited

U.S. PATENT DOCUMENTS

| | | | | |
|---|---|---|---|---|
| 3,339,609 A | * | 9/1967 | Cushman | 411/82.1 |
| 3,884,006 A | * | 5/1975 | Dietlein | 52/787.12 |
| 4,800,643 A | * | 1/1989 | Higgins | 29/458 |
| 4,812,193 A | * | 3/1989 | Gauron | 156/293 |
| 4,898,756 A | * | 2/1990 | Oefner | 428/34.1 |
| 7,757,684 B2 | * | 7/2010 | Baratta | 125/21 |

FOREIGN PATENT DOCUMENTS

| | | |
|---|---|---|
| JP | 2005-131959 A | 5/2005 |
| JP | 2005-277012 A | 10/2005 |
| JP | 2010-14252 A | 1/2010 |

OTHER PUBLICATIONS

Japanese Office Action issued in Japanese Application No. 2010-241209 dated Feb. 12, 2014.

* cited by examiner

*Primary Examiner* — Gary Estremsky
(74) *Attorney, Agent, or Firm* — Sughrue Mion, PLLC

(57) ABSTRACT

[Object] To provide a clip for attaching an EA member, of which a base portion between a flange and a cylindrical portion is reliably filled with a resin foam body, and an EA member equipped with this clip.
[Solution] A clip 30 for attaching an EA member to a member, includes a cylindrical portion 31 and flanges 32 provided at both ends of the cylindrical portion 31. In a base portion of at least one of the flanges 32, a penetrating portion 34 that penetrates through the flange 32 is formed. An EA member 20 is equipped with this clip 30.

4 Claims, 5 Drawing Sheets

CLIP FOR ATTACHING EA MEMBER, AND EA MEMBER

TECHNICAL FIELD

The present invention relates to a clip for attaching an EA member (impact energy absorption member) and to an EA member, and in particular, relates to a clip for attaching an EA member and to an EA member that are preferably applied to trim of automobiles.

BACKGROUND ART

For impact energy absorption (Energy Absorption: EA) in the case where an automobile is involved in a side collision, EA members formed of a rigid urethane are attached to door trim of automobiles. As an example of methods of attaching a rigid urethane EA member to door trim, an EA member attaching method illustrated in FIGS. 7a-7d is known.

In this example of related art, an EA member 1 formed of rigid urethane or the like and clips 2 are integrated with one another. As illustrated in FIG. 7d, the clips 2 each have a cylindrical portion 3 and flanges 4, which are provided at both ends of the cylindrical portion 3. The clips 2 are provided in extending portions 1a of the EA member 1. As illustrated in FIGS. 7a, 7b, the EA member 1 is positioned on trim 5, so that columnar protrusions 6 that protrude from the trim 5 are inserted into the clips 2. The protrusions 6 are formed of a thermoplastic resin such as polyethylene or polypropylene. Next, a welding tool (not illustrated) is brought into contact with tips of the protrusions 6, so that diameters of the tips of the protrusions 6 are each enlarged so that the tips come to have a substantially disc-like shape as illustrated in FIG. 7c. Thus, flange-shaped stopper portions 6a are formed. By doing this, the EA member 1 is secured to the trim 5.

The clips 2 are set in a mold when the EA member 1 is formed by foaming, thereby being integrated with rigid urethane or the like. An example of such a technique in which clips are set in a mold when urethane is foamed is described in Japanese Unexamined Patent Application Publication No. 2005-131959.

CITATION LIST

Patent Literature

[PTL 1] Japanese Unexamined Patent Application Publication No. 2005-131959

SUMMARY OF INVENTION

Technical Problem

When urethane is foamed with the clips 2 illustrated in FIG. 7d set in a mold, gas easily remains in a corner portion where the flange 4 and the cylindrical portion 3 intersect one another. Thus, there is a possibility of such a base portion not being sufficiently filled with urethane foam. When the base portion is not sufficiently filled with urethane foam, the clip has a decreased strength for resisting a pull-out force.

In order to prevent gas from remaining, the diameter of the flanges may be reduced. In this case, the clip has a decreased strength for resisting a pull-out force. Although the diameter of only one of the flanges may be reduced, in this case, the clip needs to be correctly oriented when the clip is set in the mold. Thus, work efficiency in setting the clip in the mold is degraded.

An object of the present invention is to solve the above-described problems and provides a clip for attaching an EA member, of which a base portion between a flange and a cylindrical portion is reliably filled with a resin foam body, and an EA member equipped with this clip.

Solution to Problem

A clip according to aspect 1 is for attaching an EA member to a member. The clip includes a cylindrical portion and flanges provided at both ends of the cylindrical portion. In a base portion of at least one of the flanges, a penetrating portion that penetrates through the flange is formed.

In the clip for attaching an EA member according to aspect 2, the penetrating portion is a long hole that extends along an outer circumference of the cylindrical portion.

In the clip for attaching an EA member according to aspect 3, a plurality of the long holes are formed so as to be spaced apart from one another in a circumferential direction of the cylindrical portion.

In the clip for attaching an EA member according to aspect 4, the opening area of the penetrating portion or penetrating portions is ¼ to ½ of the area of the flange.

In the clip for attaching an EA member according to aspect 5, the flanges each have the penetrating portion or penetrating portions.

An EA member according to aspect 6 includes the clip according to any one of aspects 1 to 5.

In the EA member according to aspect 7, the clip is embedded in a resin foam body of the EA member, one of the flanges of the clip faces an outer surface of the EA member, and the cylindrical portion and the other flange having the penetrating portion or penetrating portions are positioned inside the resin foam body.

Advantageous Effects of Invention

In the clip for attaching an EA member according to the present invention, the penetrating portion that penetrates through the flange is provided in a base portion of at least one of the flanges. This allows gas to pass through the penetrating portion when the EA member is formed. Accordingly, gas is prevented from remaining in a corner portion where the flange and the cylindrical portion intersect each other. Thus, the base portion of the flange is sufficiently filled with the resin foam body, and the clip has an increased strength for resisting a pull-out force.

By making the penetrating portion a long hole and, in addition, by forming the plurality of penetrating portions in the circumferential direction of the cylindrical portion, the gas is more sufficiently prevented from remaining in the base portion of the flange.

Furthermore, by setting the opening area of the penetrating portion(s) to ¼ to ½ of the area of the flange, the gas is more sufficiently prevented from remaining in the base portion of the flange and the strengths of the flange and clip are ensured.

The penetrating portions are preferably formed in both the flanges. In this case, there is no need for checking the orientation of the clip when the clip is set in a mold. Thus, work efficiency in molding is improved.

DESCRIPTION OF EMBODIMENTS

An embodiment will be described below with reference to FIGS. 1 to 5.

Figure 1:
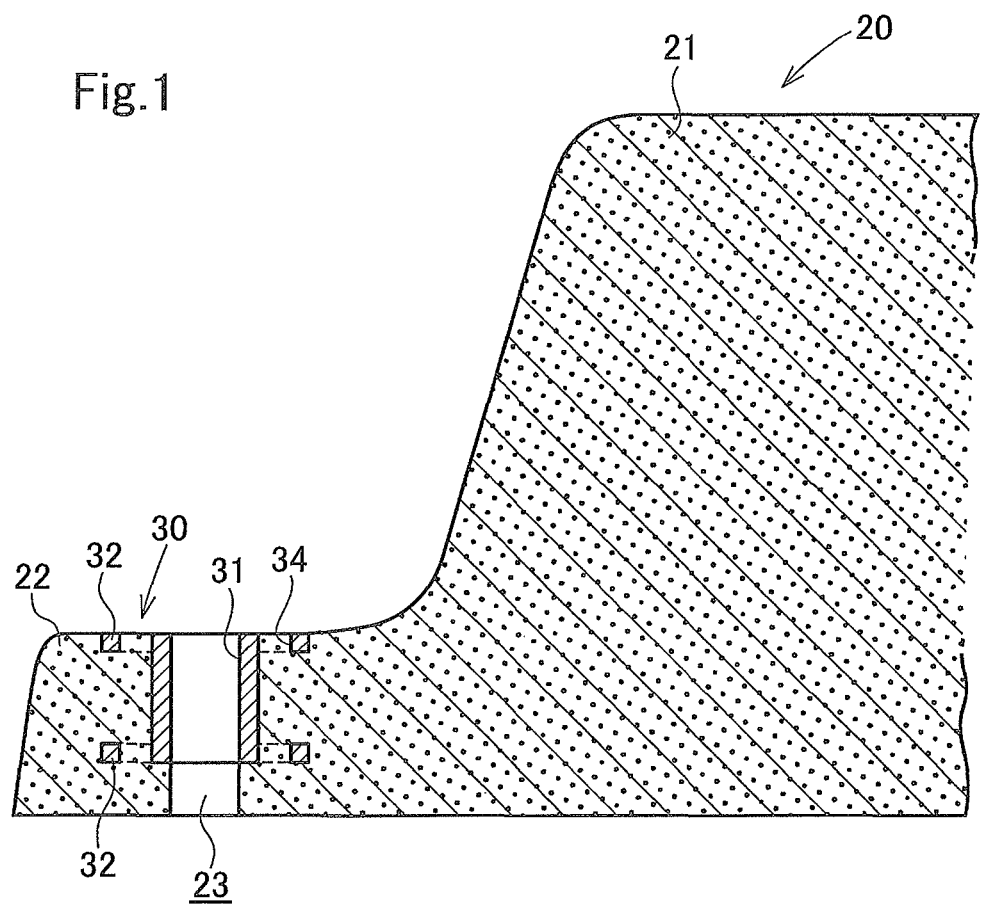
FIG. 1 is a sectional view of an EA member according to an embodiment.
Figure 2:
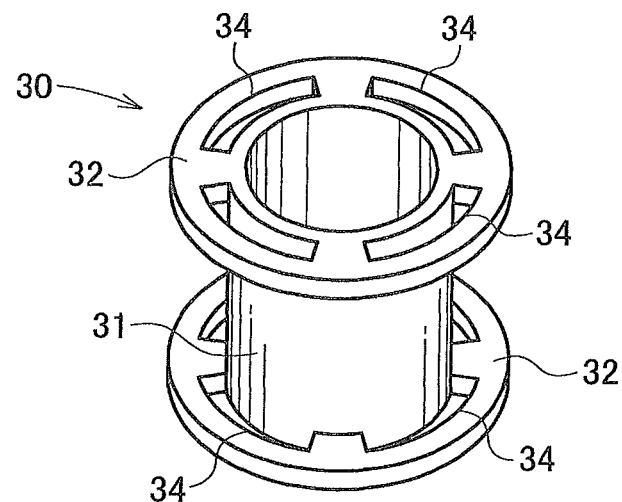
FIG. 2 is a perspective view of a clip for attaching an EA member according to the embodiment.
Figure 3:
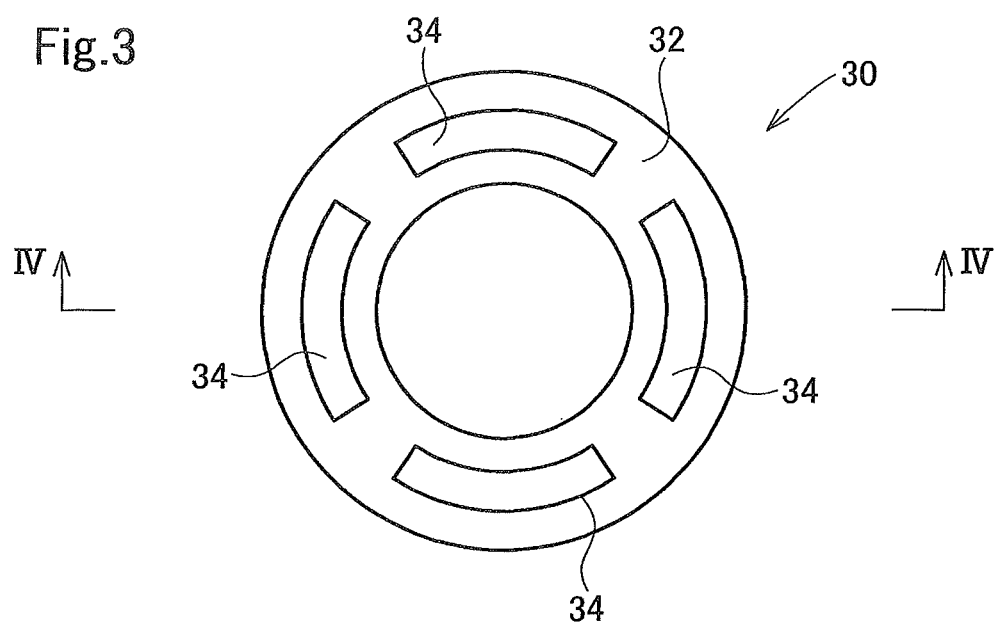
FIG. 3 is a plan view of the clip for attaching an EA member according to the embodiment.
Figure 4:
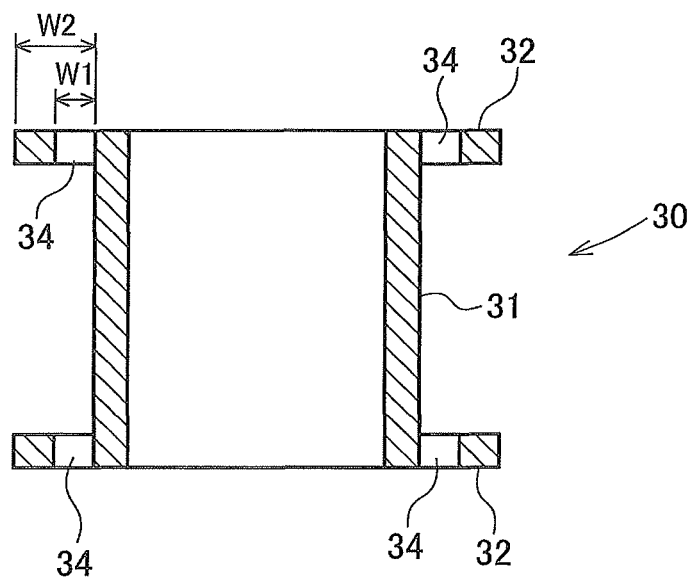
FIG. 4 is a sectional view of the clip for attaching an EA member taken along line IV-IV in FIG. 3.
Figure 5:
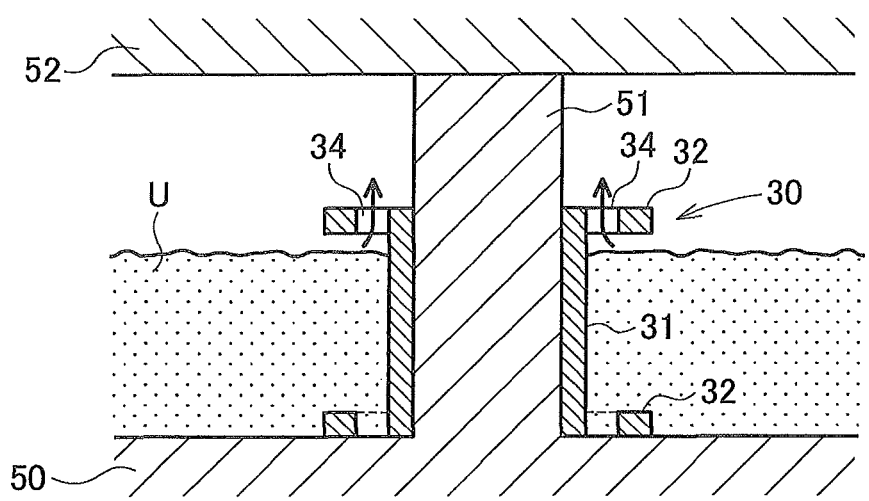
FIG. 5 is a sectional view illustrating a method of forming the EA member according to the embodiment.

FIG. 1 is a sectional view of an EA member according to the embodiment seen in a thickness direction, FIG. 2 is a perspective view of a clip for this EA member, FIG. 3 is a plan view of the clip, FIG. 4 is a sectional view of the clip taken along line IV-IV in FIG. 3, and FIG. 5 is a sectional view illustrating a method of forming the EA member.

An EA member 20 illustrated in FIG. 1 includes a main body portion 21 and an attachment portion 22, which are formed of a resin foam such as rigid urethane foam. The main body portion 21 has a board-like shape and the attachment portion 22 protrudes from a side surface of the main body portion 21. The attachment portion 22 has an attachment hole 23 for attaching the EA member 20 to trim or the like. A clip 30 for attaching an EA member (hereafter, simply called as "clip 30") is embedded in the attachment portion 22.

The clip 30 has a cylindrical portion 31, flanges 32, and holes 34. The cylindrical portion 31 defines an inner circumferential surface of the attachment hole 23. The flanges 32 are provided on both ends of the cylindrical portion 31 in a cylinder axis direction. The holes 34 are formed in the flanges 32 as penetrating portions.

The holes 34 are long holes and each extends in a circumferential direction of the cylindrical portion 31. Although four holes 34 are formed in each of the flanges 32 so as to be spaced apart from one another in the circumferential direction in the present embodiment, this does not limit the structure and the number of the holes 34. Each of the holes 34 are formed along the outer circumference of the cylindrical portion 31. The distance between each of the holes 34 and an outer circumference surface of the cylindrical portion 31 is zero.

The EA member 20 is molded as follows: the clip 30 is set in a mold such that the clip 30 is fitted onto a pin 51 of a lower die 50 of the mold as illustrated in FIG. 5. After an upper die 52 has been closed, a urethane raw liquid U is foamed in a cavity. In this case, since gas on the lower side of the upper flange 32 passes through the holes 34 of the flange 32, the lower side of the upper flange 32 is sufficiently filled with urethane foam. Furthermore, the holes 34 are long holes and extend in the circumferential direction. This allows the gas to smoothly pass through toward the upper side over the entire circumference of a base portion of the flange 32.

The EA member 20 having the above-described structure is attached to trim or the like similarly to the method illustrated in FIGS. 7a-7d. That is, the EA member 20 is positioned on the trim, so that a columnar protrusion that protrudes from the trim (not illustrated in FIG. 1) is inserted into the attachment hole 23. The protrusion is formed of a thermoplastic resin such as polyethylene or polypropylene. Next, a welding tool (not illustrated) is brought into contact with the tip of the protrusion, so that a diameter of the tip of the protrusion is enlarged, so that the tip comes to have a substantially disc-like shape. Thus, a flange-shaped stopper portion is formed. By doing this, the EA member 20 is secured to the trim. The EA member 20 may instead be attached to the trim by using a stud bolt or the like.

In this EA member 20, the base portion of the flange 32 is sufficiently filled with urethane foam. Thus, the clip 30 has an increased strength for resisting a pull-out force. The urethane foam on both the upper side and the lower side of the flange 32 may be integrated through the holes 34. In this case, the unity of the flange 32 and the urethane foam is improved.

In the above-described embodiment, the holes 34 are formed in both the flanges 32, the upper and the lower flanges 32 have the same diameter, and the clip 30 is symmetric with respect to the up-down direction. Accordingly, the shape of the clip 30 is completely the same even when the clip 30 is inverted in the up-down direction in FIG. 5. Thus, when the clip 30 is set in the mold, there is no need of carefully checking the orientation of the clip 30. This improves work efficiency in setting the clip 30 in the mold.

Although the total opening area of the holes 34 is preferably about ¼ to ½ of the area of the flanges 32, the ratio of the area is not limited to this. A width W1 of the holes 34 is preferably about ½ to ⅔ of a width W2 of the flanges 32. In the case of trim for an automobile, W1 is preferably 3 to 5 mm, and W2 is preferably 5 to 10 mm.

Figure 6:
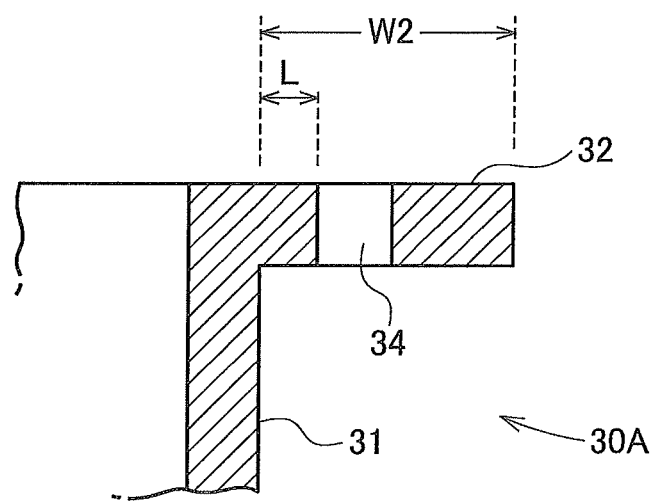
FIG. 6 is a sectional view of part of the clip for attaching an EA member according to a comparative example.
Figure 7A:
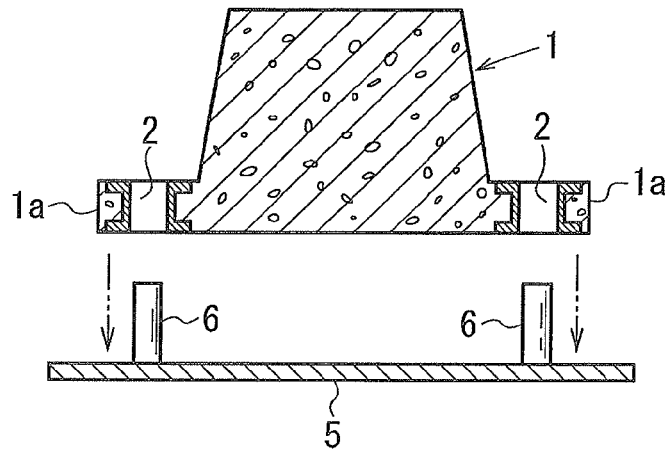
FIGS. 7a-7d are sectional views illustrating an example of related art.
Figure 7B:
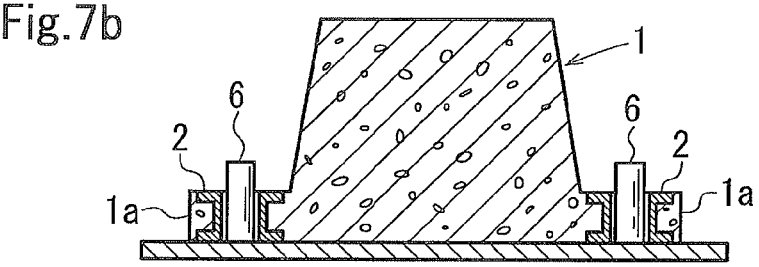
Figure 7C:
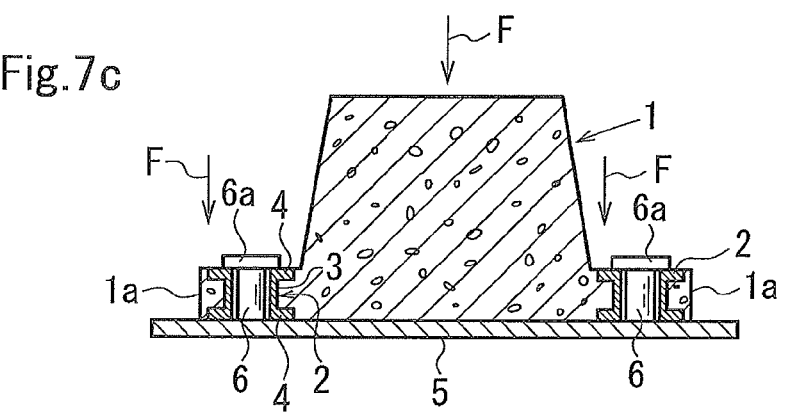
Figure 7D:
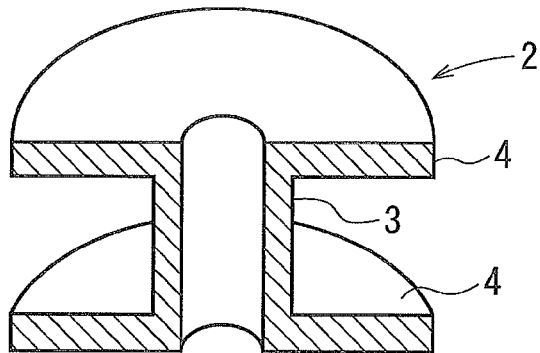

FIG. 6 is a sectional view illustrating an area around the flange 32 of a clip 30A according to a comparative example. In this comparative example, the hole 34 is spaced apart from the outer circumferential surface of the cylindrical portion 31 by a distance L. When the distance L is excessively large, the amount of gas passing through from the lower side of the flange 32 becomes insufficient. Thus, the distance L is preferably a small value, for example, the distance L is preferably 1 mm or smaller, and is particularly preferably about 0.3 mm or smaller. The distance L is most preferably 0 as is the case with the above-described embodiment.

Although the penetrating portions are holes in the above-described embodiment, the penetrating portions may be cut portions formed by cutting the flange 32 from the outer circumference thereof.

The present application is based on a Japanese patent application filed in the Japanese Patent Office on Oct. 27, 2010 (Japanese Patent Application No. 2010-241209), the entire contents of which are incorporated herein by reference.

The invention claimed is:

1. A clip for attaching an EA member to a member, the clip comprising:
   a cylindrical portion; and
   flanges provided at both ends of the cylindrical portion,
   wherein, in a base portion of at least one of the flanges, a penetrating portion that penetrates through the flange is formed,
   wherein an opening area of the penetrating portion or penetrating portions is ¼ to ½ of an area of the flange,
   wherein the penetrating portion is a long hole that extends along an outer circumference of the cylindrical portion, and
   wherein a plurality of the long holes are formed so as to be spaced apart from one another in a circumferential direction of the cylindrical portion.

2. The clip for attaching an EA member according to claim 1, wherein the flanges each have the penetrating portion or penetrating portions.

3. An EA member comprising the clip according to claim 1.

4. The EA member according to claim 3,
   wherein the clip is embedded in a resin foam body of the EA member, wherein one of the flanges of the clip for attaching an EA member faces an outer surface of the EA member, and wherein the cylindrical portion and the other flange having the penetrating portion or penetrating portions are positioned inside the resin foam body.

\* \* \* \* \*